United States Patent
Chen

(10) Patent No.: US 9,609,164 B2
(45) Date of Patent: Mar. 28, 2017

(54) DUAL-MODE SCANNING DEVICE

(71) Applicant: AVISION INC., Hsinchu (TW)

(72) Inventor: Yen-Cheng Chen, Hsin Chu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/861,890

(22) Filed: Sep. 22, 2015

(65) Prior Publication Data
US 2016/0100075 A1    Apr. 7, 2016

(30) Foreign Application Priority Data
Oct. 6, 2014  (TW) .............................. 103217750 U

(51) Int. Cl.
*H04N 1/04* (2006.01)
*H04N 1/00* (2006.01)

(52) U.S. Cl.
CPC ........... *H04N 1/04* (2013.01); *H04N 1/00005* (2013.01); *H04N 1/00037* (2013.01); *H04N 1/00092* (2013.01); *H04N 1/00755* (2013.01); *H04N 1/00779* (2013.01)

(58) Field of Classification Search
CPC ...................................................... H04N 1/04
USPC ................................................ 358/1.13, 474
See application file for complete search history.

(56) References Cited

U.S. PATENT DOCUMENTS

| | | | | |
|---|---|---|---|---|
| 6,078,051 A * | 6/2000 | Banton | ............... | G01N 21/3563 |
| | | | | 250/341.1 |
| 2003/0133196 A1* | 7/2003 | Wine | ................. | G02B 26/0841 |
| | | | | 359/578 |
| 2006/0180670 A1* | 8/2006 | Acosta | ............... | G06K 7/10732 |
| | | | | 235/462.31 |
| 2007/0194121 A1* | 8/2007 | Yang | ................. | G06K 7/10792 |
| | | | | 235/454 |
| 2010/0258629 A1* | 10/2010 | Huang | ................. | G06K 9/2018 |
| | | | | 235/449 |

* cited by examiner

*Primary Examiner* — Jacky X Zheng

(57) ABSTRACT

A scanning device includes a visible light source, an infrared light source, a visible light sensor and an infrared light sensor. The visible light source provides visible light to a scan section of an original. The original reflects the visible light to generate reflected light. The infrared light source provides infrared light to the scan section. The infrared light penetrates through the original to generate penetrating light. The visible light sensor receives the reflected light at a first scan position and generates a visible light image signal representative of a visible light image of the scan section. The infrared light sensor receives the penetrating light at a second scan position and generates an infrared light image signal representative of an infrared light image of the scan section. A relative positional relationship between the first and second scan positions is fixed.

10 Claims, 7 Drawing Sheets

DUAL-MODE SCANNING DEVICE

This application claims priority of No. 103217750 filed in Taiwan R.O.C. on Oct. 6, 2014 under 35 USC 119, the entire content of which is hereby incorporated by reference.

BACKGROUND OF THE INVENTION

Field of the Invention

The present invention relates in general to a dual-mode scanning device, and more particularly to a dual-mode scanning device capable of acquiring images of two modes of one scan section at a time.

Description of Related Art

Inpainting is the process of reconstructing lost or deteriorated parts of images and videos, and thus obtaining inpainted images and videos. For instance, in the museum world, in the case of a valuable painting, this task would be carried out by a skilled art conservator or art restorer. In the digital world, inpainting (also known as image interpolation or video interpolation) refers to the application of sophisticated algorithms to replace lost or corrupted parts of the image data (mainly small regions or to remove small defects).

A conventional scanner can be used to scan a punched document with holes, but the visible light after emitting out of the holes cannot be received by a visible light sensor, and a scanned result contains a fully black image corresponding to each hole. If this image is to be printed, a lot of toners are wasted in printing the black hole image. Although the black images can be removed with image processing software which is not very precise and occupying performance, it is not only time-consuming for users but also being a huge obstacle to users who are not good at using computers.

Although some film scanners have the functions of inpainting the scanned film image, the film needs to be scanned twice to obtain a visible light image and an infrared light image, and the visible light and the infrared light image are compared with each other to perform the inpainting. The infrared light cannot penetrate through the sheet. So, if the infrared sensor receives a signal, it represents that the hole is existing at a corresponding position. A large capacity memory, a large-capacity buffer and a high-performance processor are needed in such the scanning method, not only wasting the system resource, but the cost of the scanning device or peripheral also cannot be effectively reduced.

SUMMARY OF THE INVENTION

Accordingly, the present invention has been proposed to solve the problems of the prior art, and an object of the present invention is to provide a dual-mode scanning device, which can acquire images of two modes of the same scan section at a time to facilitate the image inpainting.

To achieve the above-identified object, the present invention provides a dual-mode scanning device comprising a visible light source, an infrared light source, a visible light sensor and an infrared light sensor. The visible light source provides visible light to a scan section of an original, and the original reflects the visible light to generate reflected light. The infrared light source provides infrared light to the scan section of the original, and the infrared light penetrates through the original to generate penetrating light. The visible light sensor receives the reflected light at a first scan position and generates a visible light image signal representative of a visible light image of the scan section. The infrared light sensor receives the penetrating light at a second scan position and generates an infrared light image signal representative of an infrared light image of the scan section, wherein a relative positional relationship between the first scan position and the second scan position is fixed.

The present invention also provides a scanning method used in a dual-mode scanning device. The scanning method comprising the steps of: scanning a scan section of an original having a defect to obtain a visible light image; scanning the scan section of the original to obtain an infrared light image; and performing image inpainting according to the visible light image and the infrared light image and obtaining an inpainted image without a defect image corresponding to the defect on the scan section of the original.

With the above-mentioned embodiment, scanning processes of two modes can be performed on the same scan section at a time to facilitate the subsequent image inpainting on the scan section, thereby eliminating the image inpainting requirement that the different scan sections need to be aligned or the whole image needs to be obtained. Therefore, the large-capacity memory and buffer and the high-performance processor are no longer needed, and the system resource can be saved. Also, the cost of the scanning device or peripheral can be effectively reduced, and the scanning device or peripheral can also perform the direct processing and then output the inpainted image to a computer device connected thereto.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to accompanying drawings.

In embodiments of the present invention, an infrared light source and an infrared light sensor as well as a visible light source and a visible light sensor are utilized to sense an infrared light image and a visible light image of the same scan section (or scan line), so that the infrared light image and the visible light image corresponding to the same scan section can be compared with each other without the whole image comparison being performed, and the inpainting procedure can be performed. In the embodiments of the present invention, whether a document has a punched hole or is damaged can be recognized according to the property that the infrared light cannot penetrate through the sheet very easily. If the infrared light sensor receives the infrared light signal, then it represents that the corresponding point is hollow or penetrated. Therefore, the position of the hole needs not to be determined using a complicated image processor.

Figure 1:
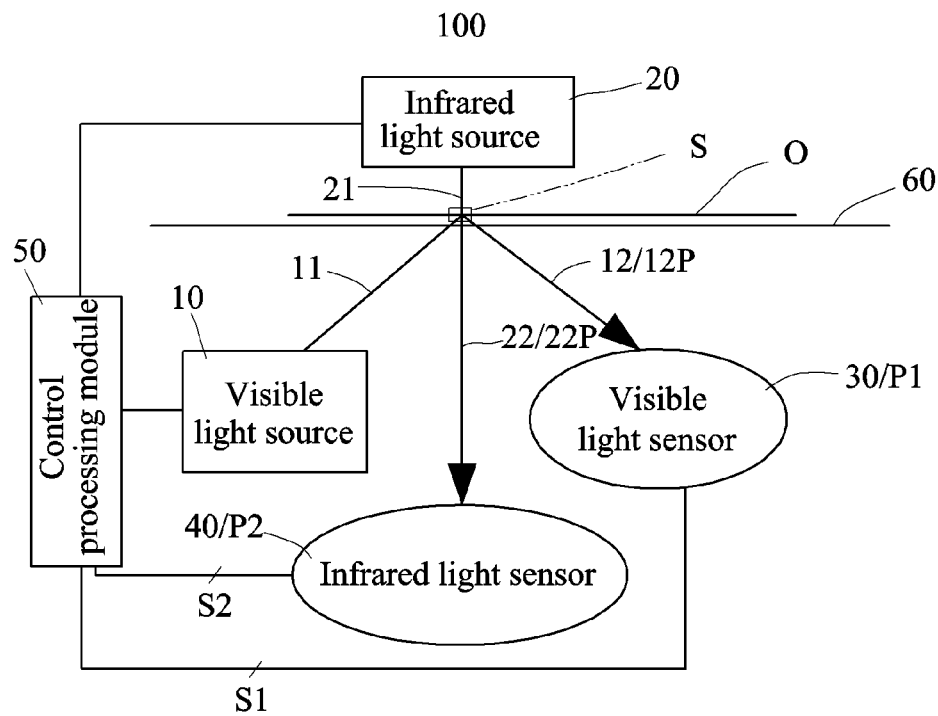
FIG. 1 is a schematic view showing a scanning device according to a first embodiment of the present invention.

FIG. 1 is a schematic view showing a dual-mode scanning device 100 according to a first embodiment of the present invention. Referring to FIG. 1, the dual-mode scanning device 100 of this embodiment comprises a visible light source 10, an infrared light source 20, a visible light sensor 30 and an infrared light sensor 40. In this embodiment, a flatbed scanner is described as an example of the scanning device 100, wherein an original O is placed on a scan platen 60. However, the present invention is not restricted thereto because similar arrangements are also applicable to a sheet-fed scanner. The scanning device 100 may have various operation modes comprising, for example but without limitation to, an inpainting mode and a normal mode. The operations in the inpainting mode will be described in the following. In the normal mode, only a combination of the visible light source 10 and the visible light sensor 30 or a combination of the infrared light source 20 and the infrared light sensor 40 is enabled to operate.

The visible light source 10 provides visible light 11 to a scan section S (or a scan line) of the original O. The original O reflects the visible light 11 to generate reflected light 12, wherein the reflecting light path needs not to follow the principle that an incident angle is equal to an angle of reflection because the reflecting light path can be determined by the position of the visible light sensor 30.

The infrared light source 20 provides infrared light 21 to the scan section S of the original O, and the infrared light 21 penetrates through the original O to generate penetrating light 22.

The visible light sensor 30 receives the reflected light 12 at a first scan position P1 and generates a visible light image signal S1 representative of a visible light image of the scan section S.

The infrared light sensor 40 receives the penetrating light 22 at a second scan position P2 and generates an infrared light image signal S2 representative of an infrared light image of the scan section S. A relative positional relationship between the first scan position P1 and the second scan position P2 is fixed. For example, the visible light sensor 30 and the infrared light sensor 40 may be fixed to a movable base (not shown), such that the relative positional relationship between the first scan position P1 and the second scan position P2 is fixed.

It is worth noting that the scan section S represents one section that can be scanned by the visible light sensor 30 or the infrared light sensor 40 when a relative position between the original O and the visible light sensor 30/infrared light sensor 40 is fixed, and is typically referred to as a scan line. The sensing operations of the visible light sensor 30 and the infrared light sensor 40 may be performed concurrently to obtain the advantage of shorting the scan time, or sequentially to obtain the advantage of preventing the interference of the visible light with the infrared light.

In this embodiment, the visible light source 10, the visible light sensor 30 and the infrared light sensor 40 are disposed on one side (bottom side) of the original O, and the infrared light source 20 is disposed on the other side (top side) of the original O. In addition, a reflecting light path 12P between the visible light sensor 30 and the visible light source 10 intersects with a penetrating linear light path 22P, which passes through the original O and goes directly from the infrared light source 20 to the infrared light sensor 40, and is disposed between the infrared light sensor 40 and the infrared light source 20 at the scan section S of the original O. Furthermore, the visible light source 10 and the visible light sensor 30 are disposed on two sides of the penetrating light path 22P.

In addition, the scanning device 100 may further comprise a control processing module 50 electrically connected to the visible light sensor 30, the infrared light sensor 40, the visible light source 10 and the infrared light source 20. In an inpainting mode, the control processing module 50 performs an image inpainting procedure on the visible light image signal S1 according to the infrared light image signal S2 to obtain an inpainted image without a hole image.

Because the visible light sensor 30 and the infrared light sensor 40 sense the images of the same scan section S, the control processing module 50 can obtain the infrared light image signal S2 and the visible light image signal S1 corresponding to the same scan section S, and directly perform the image inpainting procedure according to the infrared light image signal S2 and the visible light image signal S1, so that the inpainted image without a hole image can be obtained. After multiple scan sections S of the original are scanned, an inpainted original image, which has no hole image and is constituted by the scan sections S, can be obtained. Because the data quantity corresponding to the infrared light image signal S2 and the visible light image signal S1 of one scan section S is small, a low-level control processing module 50 can be used to perform the image inpainting procedure, and this is different from the complicated procedures of comparing the whole images with each other and inpainting the whole image.

In one example, the control processing module 50 turns on the visible light source 10 and the infrared light source 20 in the same time period, and controls the visible light sensor 30 and the infrared light sensor 40 to obtain the infrared light image signal S2 and the visible light image signal S1. This configuration can speed up the scan process.

In another example, the control processing module 50 turns on the visible light source 10 and the infrared light source 20 in different time periods, and controls the visible light sensor 30 and the infrared light sensor 40 to obtain the infrared light image signal S2 and the visible light image signal S1. This configuration can enhance the scan quality by eliminating the interference of the visible light with the infrared light.

Figure 2:
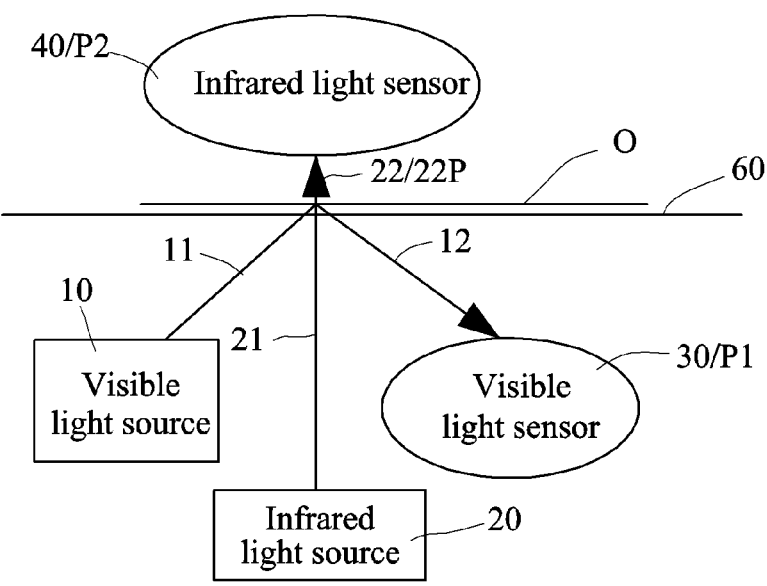
FIG. 2 is a schematic view showing a scanning device according to a second embodiment of the present invention.

FIG. 2 is a schematic view showing a scanning device according to a second embodiment of the present invention. Referring to FIG. 2, this embodiment is similar to the first embodiment except that the positions of the infrared light source 20 and the infrared light sensor 40 are swapped with each other, and the effects of this invention may also be achieved. Thus, the visible light source 10, the visible light sensor 30 and the infrared light source 20 are disposed on one side of the original O, and the infrared light sensor 40 is disposed on the other side of the original O. The reflecting light path 12P between the visible light sensor 30 and the visible light source 10 intersects with the penetrating light path 22P between the infrared light sensor 40 and the infrared light source 20 at the scan section S of the original O. In addition, the visible light source 10 and the visible light sensor 30 are disposed on two sides of the penetrating light path 22P.

Figure 3A:
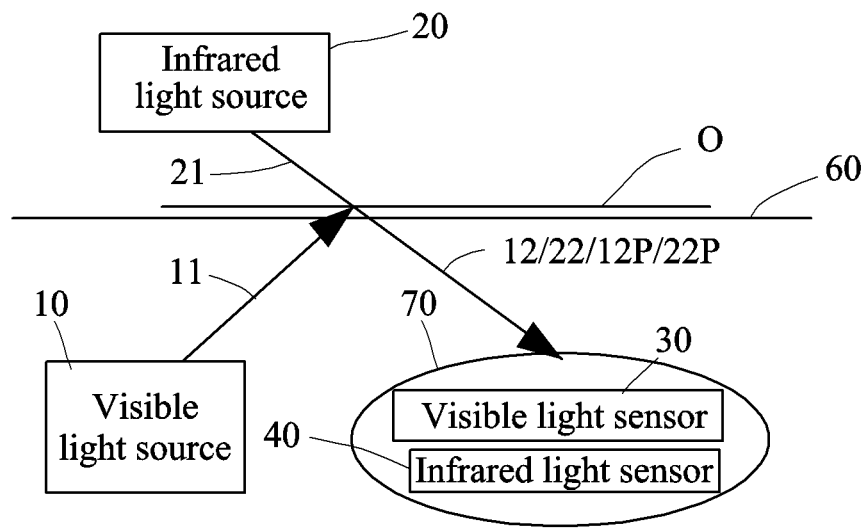
FIG. 3A is a schematic view showing a scanning device according to a third embodiment of the present invention.

FIG. 3A is a schematic view showing a scanning device according to a third embodiment of the present invention. Referring to FIG. 3A, this embodiment is similar to the first embodiment except that the visible light sensor 30 and the infrared light sensor 40 constitute a sensor assembly 70, and that the reflecting light path 12P and the penetrating light path 22P partially overlap with each other. This configuration is advantageous to the integration of the sensors.

Figure 3B:
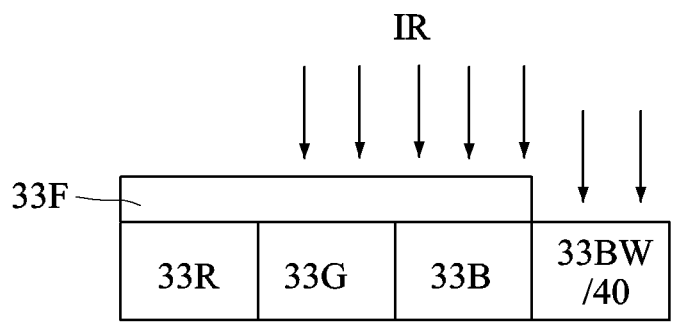
FIGS. 3B and 3C are schematic views showing two examples of a visible light sensor and an infrared light sensor.
Figure 3C:
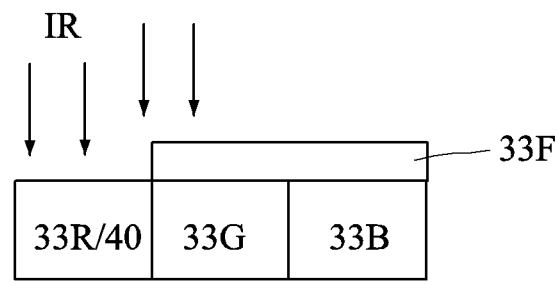

How the present invention is implemented will be described with reference to an example, in which a color charge-coupled device (CCD) type image sensor is used. FIGS. 3B and 3C are schematic views showing two examples of a visible light sensor and an infrared light sensor. As shown in FIG. 3B, the image sensor has black-and-white, red, green and blue sensing pixels 33BW, 33R, 33G and 33B respectively. The black-and-white sensing pixel 33BW functions as the infrared light sensor 40, and is thus not covered by an infrared light filter 33F. The red, green and blue sensing pixels 33R, 33G and 33B function as a visible light sensor 30, and are thus covered by the infrared light filter 33F, which stops the infrared light IR from entering the red, green and blue sensing pixels 33R, 33G and 33B. The above-mentioned configuration is designed for the operation in the inpainting mode. On the other hand, when the configuration is to be used in the normal mode, the black-and-white, red, green and blue sensing pixels 33BW, 33R, 33G and 33B may be adopted to sense the black-and-white, red, green and blue light rays (or images of the original) to obtain a color image signal.

In addition, as shown in FIG. 3C, the color image sensor has no black-and-white sensing pixel, and only has the red, green, blue sensing pixels 33R, 33G and 33B. The red sensing pixel 33R also functions as the infrared light sensor 40 to sense the infrared light image in the inpainting mode, and is thus not covered by the infrared light filter 33F. The black image obtained in the normal mode is formed by synthesizing the sensing results of the red, green and blue sensing pixels. So, in this example, the infrared light sensor 40 senses the red image of the hole-free document or original, and the red, green and blue sensing pixels 33R, 33G and 33B of the visible light sensor sense the red, green and blue images of the hole-free document or original in the normal mode of the scanning device.

Figure 4:
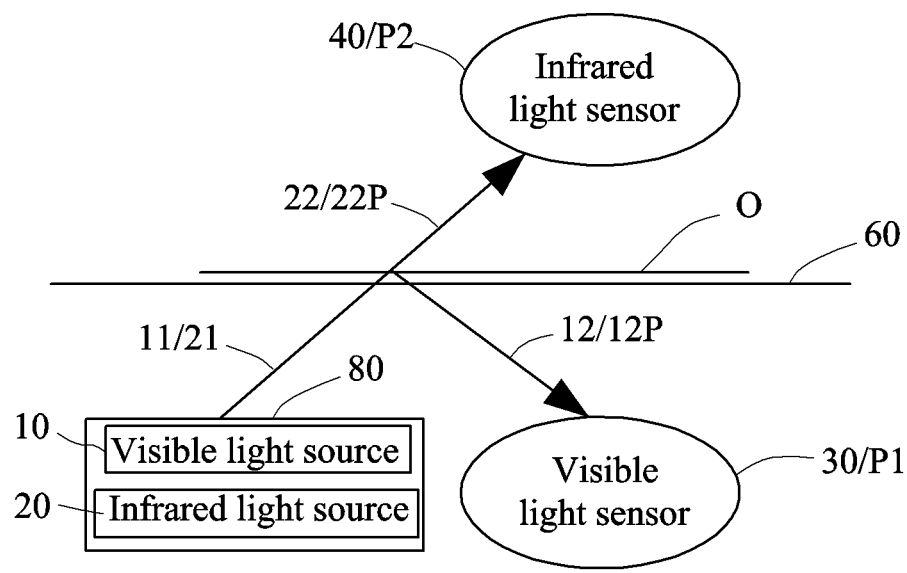
FIG. 4 is a schematic view showing a scanning device according to a fourth embodiment of the present invention.

FIG. 4 is a schematic view showing a scanning device according to a fourth embodiment of the present invention. Referring to FIG. 4, this embodiment is similar to the first embodiment except that the visible light source 10 and the infrared light source 20 constitute a light source assembly 80, and that the reflecting light path 12P and the penetrating light path 22P partially overlap with each other. This configuration is advantageous to the integration of the light sources.

Figure 5:
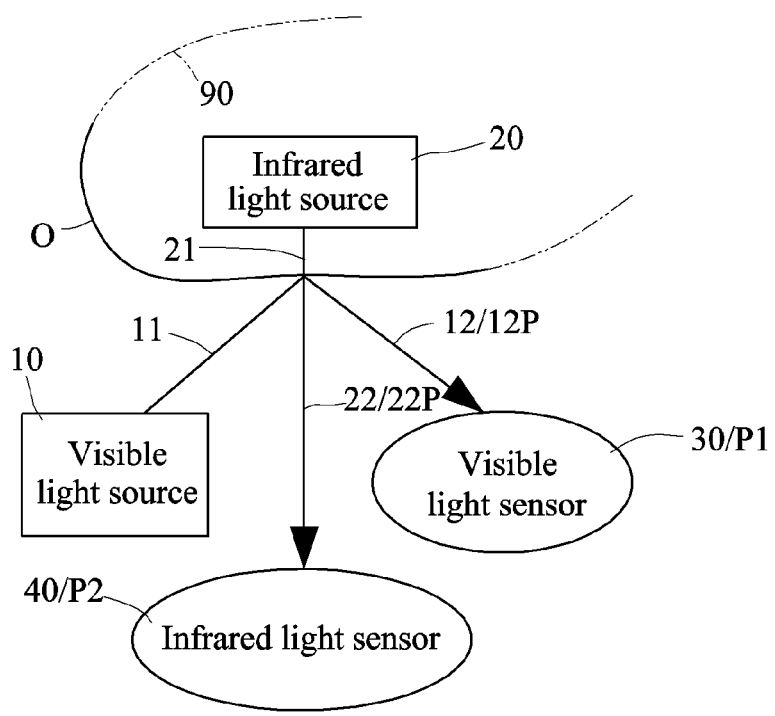
FIG. 5 is a schematic view showing a scanning device according to a fifth embodiment of the present invention.

FIG. 5 is a schematic view showing a scanning device according to a fifth embodiment of the present invention. Referring to FIG. 5, this embodiment is similar to the first embodiment except for the application of the sheet-fed scanner. The original O is transported along a U-shaped transporting passage 90, and the infrared light source 20 is partially surrounded by the U-shaped transporting passage 90 or disposed in the space partially surrounded by the U-shaped transporting passage 90. This configuration is advantageous to the optimization of the redundant space of the U-shaped transporting passage 90.

Figure 6:
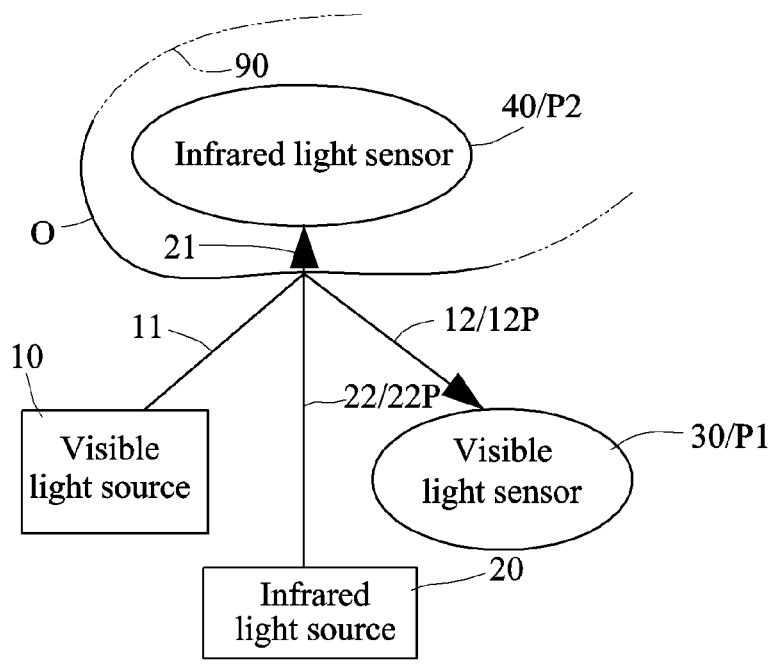
FIG. 6 is a schematic view showing a scanning device according to a sixth embodiment of the present invention.

FIG. 6 is a schematic view showing a scanning device according to a sixth embodiment of the present invention. Referring to FIG. 6, this embodiment is similar to the second embodiment except for the application of the sheet-fed scanner. The original O is transported along a U-shaped transporting passage 90, and the infrared light sensor 40 is partially surrounded by the U-shaped transporting passage 90, or disposed in the space partially surrounded by the U-shaped transporting passage 90. This configuration is advantageous to the optimization of the redundant space of the U-shaped transporting passage 90.

Figure 7:
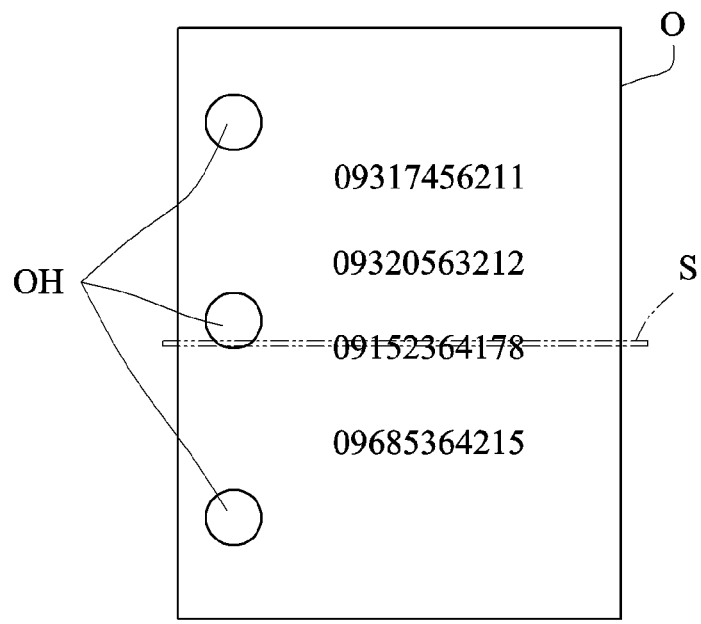
FIG. 7 is a schematic view showing an original.
Figure 8:
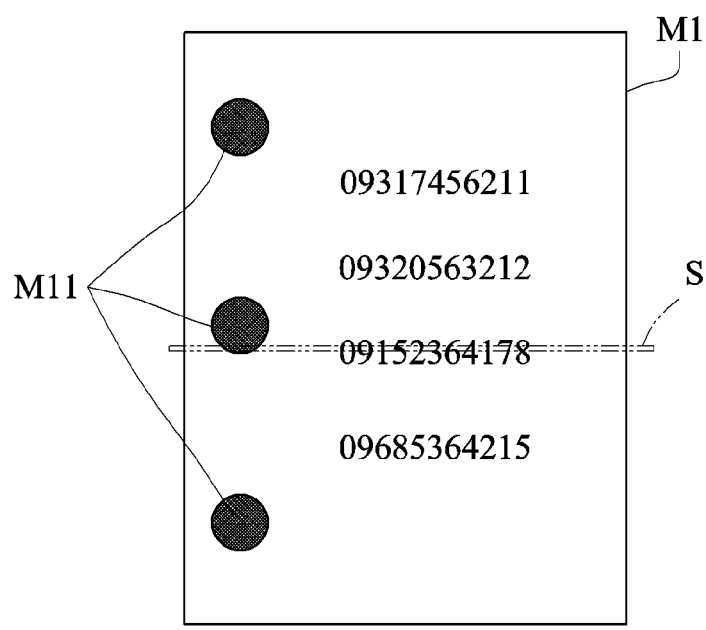
FIG. 8 is a schematic view showing a visible light image.
Figure 9:
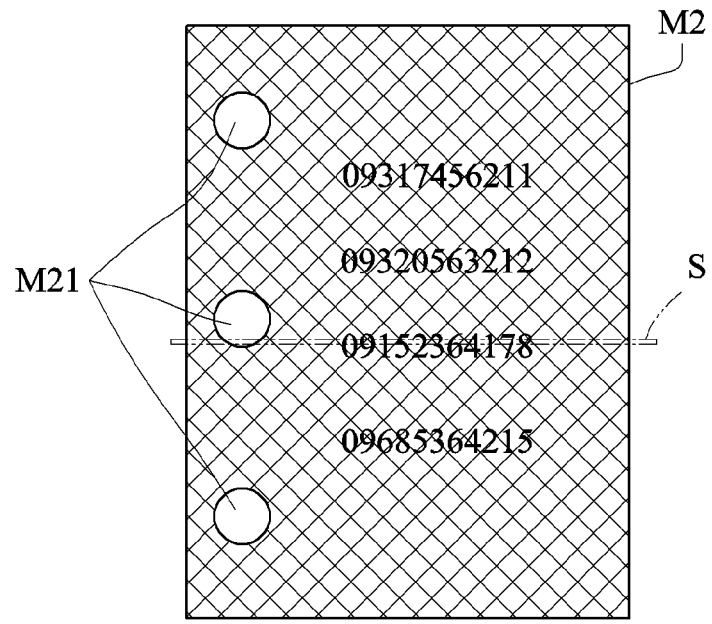
FIG. 9 is a schematic view showing an infrared light image.
Figure 10:
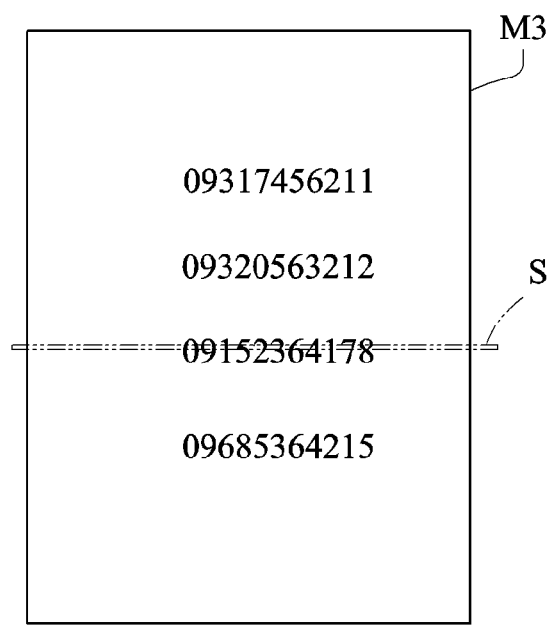
FIG. 10 is a schematic view showing an inpainted image.

FIG. 7 is a schematic view showing an original. Referring to FIG. 7, the original O has three holes OH and is printed with some numbers, wherein one scan section S corresponds to one portion of the hole OH and one portion of the number. FIG. 8 is a schematic view showing a visible light image. As shown in FIG. 8, a hole image M11 of a visible light image M1 is black. FIG. 9 is a schematic view showing an infrared light image. As shown in FIG. 9, a hole image M21 of an infrared light image M2 is white because the infrared light penetrates through the hole. FIG. 10 is a schematic view showing an inpainted image. As shown in FIG. 10, an inpainted image M3 can be generated according to the visible light image M1 and the infrared light image M2. It is worth noting that the partial images of the scan section S of FIGS. 7 to 10 may be inpainted into the inpainted image without the global image comparison being performed.

Figure 11:
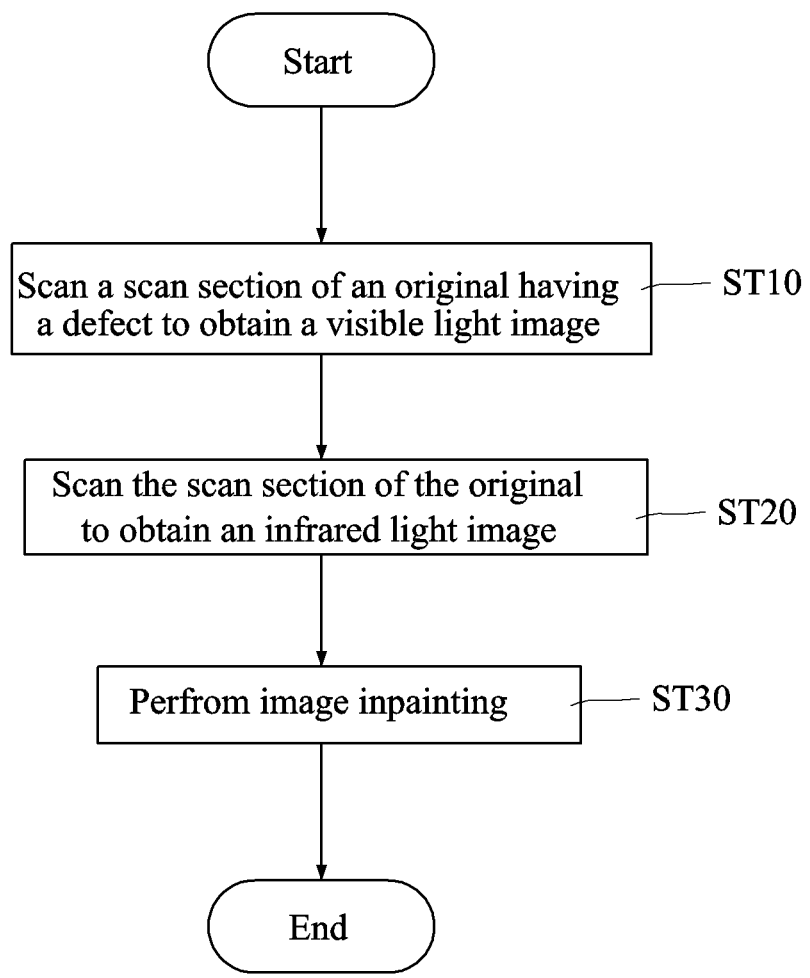
FIG. 11 is a flow chart showing a scanning method of the present invention.

Therefore, the invention also provides a scanning method used in the scanning device. FIG. 11 is a flow chart showing a scanning method of the present invention. Referring to FIG. 11, the scanning method comprises the following steps. In step ST10, a scan section of an original having a defect is scanned to obtain a visible light image. In step ST20, the scan section of the original is scanned to obtain an infrared light image. In step ST30 and image inpainting is performed according to the visible light image and the infrared light image to obtain an inpainted image without a defect image corresponding to the defect on the scan section of the original. It is to be noted that the scan section of the original is not the entire original, and the defect may be a partial portion or an entire portion of the punched hole of the original, or a damaged region of the original. So, other scan sections of the original may be scanned previously and/or later in one scanning process of the scanning device.

With the above-mentioned embodiments, scanning processes of two modes can be performed on the same scan section at a time to facilitate the subsequent image inpainting on the scan section, thereby eliminating the image inpainting requirement that the different scan sections need to be aligned or the whole image needs to be obtained. Consequently, the large-capacity memory and buffer and the high-performance processor are no longer needed, and the system resource can be saved. Also, the cost of the scanning device or peripheral can be effectively reduced, and the scanning device or peripheral can also perform the direct processing and then output the inpainted image to a computer device connected thereto.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A dual-mode scanning device, comprising:
a visible light source providing visible light to a scan section of an original, the original reflecting the visible light to generate reflected light;
an infrared light source providing infrared light to the scan section of the original, the infrared light penetrating through the original to generate penetrating light;
a visible light sensor receiving the reflected light at a first scan position and generating a visible light image signal representative of a visible light image of the scan section; and
an infrared light sensor receiving the penetrating light at a second scan position and generating an infrared light image signal representative of an infrared light image of the scan section, wherein a relative positional relationship between the first scan position and the second scan position is fixed, wherein the visible light source and the visible light sensor are disposed on two sides of a penetrating linear light path, which passes through the original and goes directly from the infrared light source to the infrared light sensor, respectively.

2. The dual-mode scanning device according to claim 1, wherein the visible light source, the visible light sensor and the infrared light sensor are disposed on one side of the original, the infrared light source is disposed on the other side of the original, and a reflecting light path between the visible light sensor and the visible light source intersects with the penetrating linear light path at the scan section of the original.

3. The dual-mode scanning device according to claim 1, wherein the visible light source, the visible light sensor and the infrared light source are disposed on one side of the original, the infrared light sensor is disposed on the other side of the original, and a reflecting light path between the visible light sensor and the visible light source intersects with the penetrating linear light path at the scan section of the original.

4. The dual-mode scanning device according to claim 1, further comprising:
a control processing module electrically connected to the visible light sensor, the infrared light sensor, the visible light source and the infrared light source, wherein in an inpainting mode, the control processing module performs an image inpainting procedure on the visible light image signal according to the infrared light image signal to obtain an inpainted image without a hole image.

5. The dual-mode scanning device according to claim 4, wherein the control processing module turns on the visible light source and the infrared light source in the same time period, and controls the visible light sensor and the infrared light sensor to obtain the infrared light image signal and the visible light image signal.

6. The dual-mode scanning device according to claim 4, wherein the control processing module turns on the visible light source and the infrared light source in different time periods, and controls the visible light sensor and the infrared light sensor to obtain the infrared light image signal and the visible light image signal.

7. The dual-mode scanning device according to claim 1, wherein the original is transported along a U-shaped transporting passage, and the infrared light source or the infrared light sensor is partially surrounded by the U-shaped transporting passage.

8. The dual-mode scanning device according to claim 1, wherein:
the visible light sensor receives the reflected light at the first scan position and generates the visible light image signal representative of the visible light image of the scan section in a normal mode; and
the infrared light sensor receives the penetrating light at the second scan position and generates the infrared light image signal representative of the infrared light image of the scan section in an inpainting mode, wherein:
in the normal mode, the infrared light sensor senses a black-and-white image of the original, and the visible light sensor senses red, green and blue images of the original.

9. The dual-mode scanning device according to claim 8, wherein the visible light sensor has an infrared light filter to stop the infrared light from entering a sensing portion of the visible light sensor.

10. The dual-mode scanning device according to claim 1, wherein:
the visible light sensor receives the reflected light at the first scan position and generates the visible light image signal representative of the visible light image of the scan section in a normal mode; and
the infrared light sensor receives the penetrating light at the second scan position and generates the infrared light image signal representative of the infrared light image of the scan section in an inpainting mode, wherein:
in the normal mode, the infrared light sensor senses a red image of the original, and the visible light sensor senses red, green and blue images of the original.

* * * * *